US012005405B2

(12) United States Patent
Riebel et al.

(10) Patent No.: US 12,005,405 B2
(45) Date of Patent: Jun. 11, 2024

(54) APPARATUS AND PROCESS FOR CONTINUOUS ADSORPTION

(71) Applicant: DSM IP ASSETS B.V., Te Heerlen (NL)

(72) Inventors: Peter Riebel, Kaiseraugst (CH); Kai Urban, Kaiseraugst (CH)

(73) Assignee: DSM IP ASSETS B.V., Te Heerlen (NL)

(*) Notice: Subject to any disclaimer, the term of this patent is extended or adjusted under 35 U.S.C. 154(b) by 766 days.

(21) Appl. No.: 17/257,701

(22) PCT Filed: Jul. 12, 2019

(86) PCT No.: PCT/EP2019/068797
§ 371 (c)(1),
(2) Date: Jan. 4, 2021

(87) PCT Pub. No.: WO2020/011967
PCT Pub. Date: Jan. 16, 2020

(65) Prior Publication Data
US 2021/0291126 A1  Sep. 23, 2021

(30) Foreign Application Priority Data
Jul. 12, 2018 (EP) .................................. 18183247

(51) Int. Cl.
*B01F 23/00* (2022.01)
*B01F 23/50* (2022.01)
(Continued)

(52) U.S. Cl.
CPC ............ *B01F 23/53* (2022.01); *B01F 23/511* (2022.01); *B01F 23/54* (2022.01);
(Continued)

(58) Field of Classification Search
CPC ...... B01F 23/53; B01F 23/54; B01F 27/2123; B01F 27/231; B01F 27/62; B01F 23/511
See application file for complete search history.

(56) References Cited

U.S. PATENT DOCUMENTS

| 2,888,045 A | 5/1959 | Reaves et al. |
| 5,609,416 A | 3/1997 | Duckworth |

(Continued)

FOREIGN PATENT DOCUMENTS

| WO | 2007/038128 A2 | 4/2007 |
| WO | 2012/089729 A1 | 7/2012 |

*Primary Examiner* — Anshu Bhatia
(74) *Attorney, Agent, or Firm* — Dilworth & Barrese, LLP

(57) ABSTRACT

The invention relates to an apparatus for the continuous production of a particulate adsorption product, the apparatus comprising: a mixing drum having an elongated cavity for receiving a particulate adsorbent material, an adsorbent inlet and a product outlet, wherein the mixing drum is arranged such that the cavity is inclined in flow direction of the particulate material, and wherein the cavity comprises an initial transport zone adjacent to the inlet and a mixing zone following the initial transport zone; a rotating member extending through the cavity in a longitudinal direction, wherein the rotating member comprises a helical conveying blade at longitudinal positions corresponding to the initial transport zone and mixing instruments at longitudinal positions corresponding to the mixing zone; and one or more injection nozzles for injecting a liquid adsorbate to the mixing zone. The invention further relates to a process for the continuous production of a particulate adsorption product using such apparatus.

22 Claims, 5 Drawing Sheets

(51) Int. Cl.
*B01F 23/53* (2022.01)
*B01F 27/2123* (2022.01)
*B01F 27/231* (2022.01)
*B01F 27/60* (2022.01)
*B01F 27/61* (2022.01)
*B01F 27/70* (2022.01)
*B01F 101/22* (2022.01)

(52) U.S. Cl.
CPC ........ *B01F 27/2123* (2022.01); *B01F 27/231* (2022.01); *B01F 27/61* (2022.01); *B01F 27/62* (2022.01); *B01F 27/70* (2022.01); *B01F 2101/22* (2022.01)

(56) References Cited

U.S. PATENT DOCUMENTS 6,004,589 A    12/1999  Song et al.
6,183,560 B1 *  2/2001  Sarrasin .............. B01F 27/1921
                                                 118/19

* cited by examiner

APPARATUS AND PROCESS FOR CONTINUOUS ADSORPTION

BACKGROUND OF THE INVENTION

The invention relates to an apparatus and a process for the continuous production of a particulate adsorption product.

Processes for the production of particulate adsorbent materials such as silica, charcoal or zeolite having an adsorbate adsorbed thereon are widely known. At least in fields requiring a high homogeneity of the adsorbate loading, these processes are usually designed as batch processes. In the interest of cost and process efficiency, however, continuous settings would be preferable to batch settings.

SUMMARY OF THE INVENTION

The invention aims to provide an apparatus and process the continuous production of a high quality particulate adsorption product.

Against this background, the invention relates to an apparatus for the continuous production of a particulate adsorption product, the apparatus comprising: a mixing drum having an elongated cavity for receiving a particulate adsorbent material (carrier), an adsorbent inlet and a product outlet, wherein the mixing drum is arranged such that the cavity is inclined in flow direction of the particulate material, and wherein the cavity comprises an initial transport zone adjacent to the inlet and a mixing zone following the initial transport zone; a rotating member extending through the cavity in a longitudinal direction, wherein the rotating member comprises a helical conveying blade at longitudinal positions corresponding to the initial transport zone and mixing instruments at longitudinal positions corresponding to the mixing zone; and one or more injection nozzles for injecting a liquid adsorbate to the mixing zone.

The cavity is preferably tubular and may have a circular cross-section. The apparatus preferably comprises a motor such as an electric motor for driving the rotating member at a desired speed. The rotating member may comprise a shaft that is surrounded by the conveying blade and mixing instruments. It can also be interrupted as in a centerless screw conveyor. Preferably, the rotating member is one integral part such that all conveying blades and mixing instruments can be operated at the same rotational speed by the same motor. Preferably the rotating member is devoid of a helical conveying blade at longitudinal positions corresponding to the mixing zone and devoid of mixing instruments at longitudinal positions corresponding to the initial transport zone.

In one embodiment, the injection nozzles can be located within 45° from the upper crest of the longitudinal cavity side wall. In one embodiment, the inlet can be located at the top of the longitudinal cavity side wall. In one embodiment, the outlet can be located at the bottom of the longitudinal cavity side wall.

In one embodiment, the mixing instruments comprise mixing paddles that are preferably distributed over the length of the mixing zone. The distribution can be regular or irregular.

In one embodiment, the operative surfaces of the paddles are slanted backwards. In other words, the operative surfaces of the paddles are not parallel to the longitudinal direction cavity but are slanted to effect reverse movement of the particulate material. Such reverse mixing can beneficially influence adsorption quality and homogeneity.

In one embodiment, the mixing instruments comprise screw fragments. Such fragments can be used to transport the material from one group of paddles to a subsequent group of paddles.

In one embodiment, the cavity further comprises a terminal transport zone adjacent to the outlet. At longitudinal positions corresponding to the terminal transport zone, the rotating member comprises a further helical conveyor blade. Preferably the rotating member is devoid of mixing instruments at longitudinal positions corresponding to the terminal transport zone. The terminal transport zone may directly follow the mixing zone or there may be one or more zones in between.

In one embodiment, the cavity further comprises a resting zone following the mixing zone, hence preferably between the mixing zone and the terminal transport zone. At longitudinal positions corresponding to the resting zone, the rotating member is devoid of mixing instruments or conveyor blades. The resting zone increases residence time and may beneficially influence adsorption quality and homogeneity.

In one embodiment, the cavity further comprises an intermediate transport zone between the mixing zone and the resting zone, or within the mixing zone. At longitudinal positions corresponding to the intermediate transport zone, the rotating member comprises another helical conveyor blade. Preferably the rotating member is devoid of mixing instruments at longitudinal positions corresponding to the intermediate transport zone. In case the intermediate transport zone is contained within the mixing zone, the mixing zone is split into a primary and secondary mixing zone. In this regard, it is preferred that the injection nozzles are arranged to inject the liquid adsorbate to the primary mixing zone, which is closer to the inlet.

The resting zone may have a longitudinal extension that is equal or greater than the longitudinal extension of the initial transport zone, the terminal transport zone, or the intermediate transport zone. Likewise, the longitudinal extension of the resting zone may be equal or greater than the longitudinal extension of at least one of the mixing zones. In another embodiment, the resting zone can extend over at least 10%, at least 15% or at least 20% of the length of the cavity. In the resting zone, the adsorption process can proceed in an undisturbed manner and an overall improvement in adsorption times can be obtained, without agitating the material too much and enhancing particle grinding or dust explosions.

The incline is preferable for process stability and optimized use of the cavity volume. The incline angle can be, for example, between 15 and 45°.

In one embodiment, the L/D (length/diameter) ratio of the cavity is between 2 and 10, preferably between 3 and 7. The total volume of the cavity can, in one example, be between 0, 1 and 2 m$^3$, but smaller or larger volumes are also possible.

In one embodiment, the incline angle and the length and diameter of the mixing zone are such that there are longitudinal positions within the mixing zone whose entire cross-section remains below the level of product removal. The level of product removal may correspond to the outlet level. In case of a terminal or intermediate transport zone, the level of product removal may also correspond to the lowest point reached by terminal or intermediate zone transport means such as conveyor blades. Longitudinal positions whose entire cross-section remains below the level of product removal, in operation, would be fully filled with the flowable material. Hence, the mixing zone, when in operation, comprises early longitudinal positions that are fully filled with particulate material and late longitudinal positions that are partially filled with particulate material.

In one embodiment, the incline angle and the length and diameter of the mixing zone are such that longitudinal positions whose entire cross-section remains below the level of product removal account for at least 30% of all longitudinal positions within the mixing zone. In other words, this means that the initial at least 30% of the length of the mixing zone, in operation, are fully filled with particulate material, whereas the remaining part is only partially filled. Preferably, the incline angle and the length and diameter of the mixing zone are such that longitudinal positions whose entire cross-section remains below the level of product removal account for at least 50% to at least 70% of all longitudinal positions within the mixing zone.

In one embodiment, the incline angle, the length and diameter of the mixing zone and the positions of the injection nozzles are such that all injection nozzles are located below the level of product removal. In this embodiment, the spray zone is always filled with particulate material. This minimizes explosion risk when inflammable adsorbates are used.

In case of a resting zone successive to the mixing zone, or in the case of primary and secondary mixing zones, the above considerations to the length and diameter of the mixing zone in relation to the incline angle to obtain fully and partially filled sections of the mixing zone may likewise apply to the resting zone and each of the mixing zones, especially the primary mixing zone.

In one embodiment, the apparatus comprises a lifting device for adjusting the incline of the cavity. Suitable lifting devices can comprise, for example, one or more hydraulic cylinders.

In one embodiment, the inlet is connected to a suitable powder feeder. Suitable powder feeders include, for example, gravimetric loss-on-weight feeders or volumetric feeders.

In one embodiment, the nozzles are connected to a suitable liquid supply. The supply may include a tank and a liquid pump with mass or volume flow meter. The liquid tank and/or supply means may comprise heating elements to preheat the liquid to optimal temperature. Such may be important to be able to adjust the viscosity to a level that is necessary for atomization of the liquid at the nozzles.

In one embodiment, the mixing drum comprises a means for heating and/or cooling the cavity. In one embodiment, the mixing drum may comprise double jacketed walls and the apparatus may comprise a pump to cause a flow of heat exchange liquid through these walls. A precise temperature regimen inside the cavity may positively influence adsorption behavior.

The invention further relates to a process for the continuous production of a particulate adsorption product using an apparatus according to the invention, the process comprising the steps of: continuously feeding a flowable particulate adsorbent material into the initial transport zone of the cavity through the inlet; continuously injecting a liquid adsorbate into the mixing zone of the cavity through the nozzles; and continuously operating the rotating member to propagate the adsorbent through the initial transport zone to the mixing zone and to agitate the adsorbent and the adsorbate in the mixing zone.

Product can be continuously removed from the product outlet. In the mixing zone or the resting zone, if any, the mixture is pushed forward against gravity by the subsequently conveyed material.

Suitable particulate adsorbent materials include, for example, granular materials. The average grain size may be between 10-1000 μm and preferably between 50-500 μm as determined with laser diffraction system dry measurement (Malvern MasterSizer 3000). The inclusive graphic standard deviation of the granular material diameter as expressed in phi units may be smaller 1.

In one embodiment, the particulate adsorbent material is a porous material having a specific surface area of at least 100 m$^2$/g and preferably at least 200 m$^2$/g, as determined using the BET method according to DIN ISO 9277.

In one embodiment, the particulate adsorbent material is a porous material having an oil adsorption capacity of between 100 and 300 ml/100 g, as determined according to DIN ISO 19246.

On the material end, adsorbent materials include, for example, silica, charcoal or zeolite materials. Silica materials can be specifically preferred.

In one embodiment, the rotating member is operated at a rotational speed such that the peripheral speed of the helical conveying blade and the mixing instruments is 1 m/s or less. These low peripheral speeds can be preferred to avoid excessive frictional heat and unwanted dust formation due to grinding of the particulate materials. The risk of smoldering, fires and dust explosions can thereby be minimized. In case the radial extension is not identical for the helical conveyor blade(s) and mixing paddles, the peripheral speed as defined above relates to the point of highest radial extension. Depending on the radius of the cavity, such can correspond to rotational speeds of, e.g., less than 50 rpm.

The liquid adsorbate may be a pure liquid active or a liquid solution or dispersion of an active. The active may be a biologically active component such as a nutritional additive (vitamins etc.), a medicine, a poison, or the like.

In one embodiment, the liquid is preheated before feeding to the nozzles. In one embodiment, nozzle pressure and liquid viscosity is adjusted such that the liquid is atomized upon entering the mixing zone. For example, the liquid temperature can be such that the viscosity is between 10 and 500 mPa·s, preferably between 50 and 200 mPa·s. The nozzle pressure can, in one example, be between 2 and 9 bars, while also higher or lower nozzle pressures are possible, depending on the nozzle type.

In one exemplary embodiment, the particulate adsorbent material can be provided and conveyed at a temperature of between 15-35° C.

In one embodiment, the feed rate of particulate adsorbent material and the rotational speed of the rotating member are adjusted such that the average residence time of the particulate material is between 2 and 20 minutes, preferably between 5 and 10 minutes. Depending on cavity volume, exemplary feed rates can exceed 100, 500, 1.000 or even 5.000 kg/h.

In one embodiment, the ratio of the introduction rate of liquid adsorbate to the introduction rate of particulate adsorbent material may be adjusted in agreement with the adsorption capacity of the respective material pairs. Depending on application, desirable ratios can be at least 40 ml liquid adsorbate per 100 g particulate adsorbent material.

In one embodiment, the cavity volume unoccupied by the particulate material is filled with ambient air. In other words, no inert gas blanket is introduced to the cavity. As dust formation and flammable vapor is largely avoided by the construction of the apparatus, inert gas may not be needed to avoid any explosion risk, even when using flammable materials.

BRIEF DESCRIPTION OF THE DRAWINGS

Further details and advantages of the invention will be explained in the following with reference to the figures and working examples. The figures show.

DESCRIPTION OF THE PREFERRED EMBODIMENTS

Figure 1:
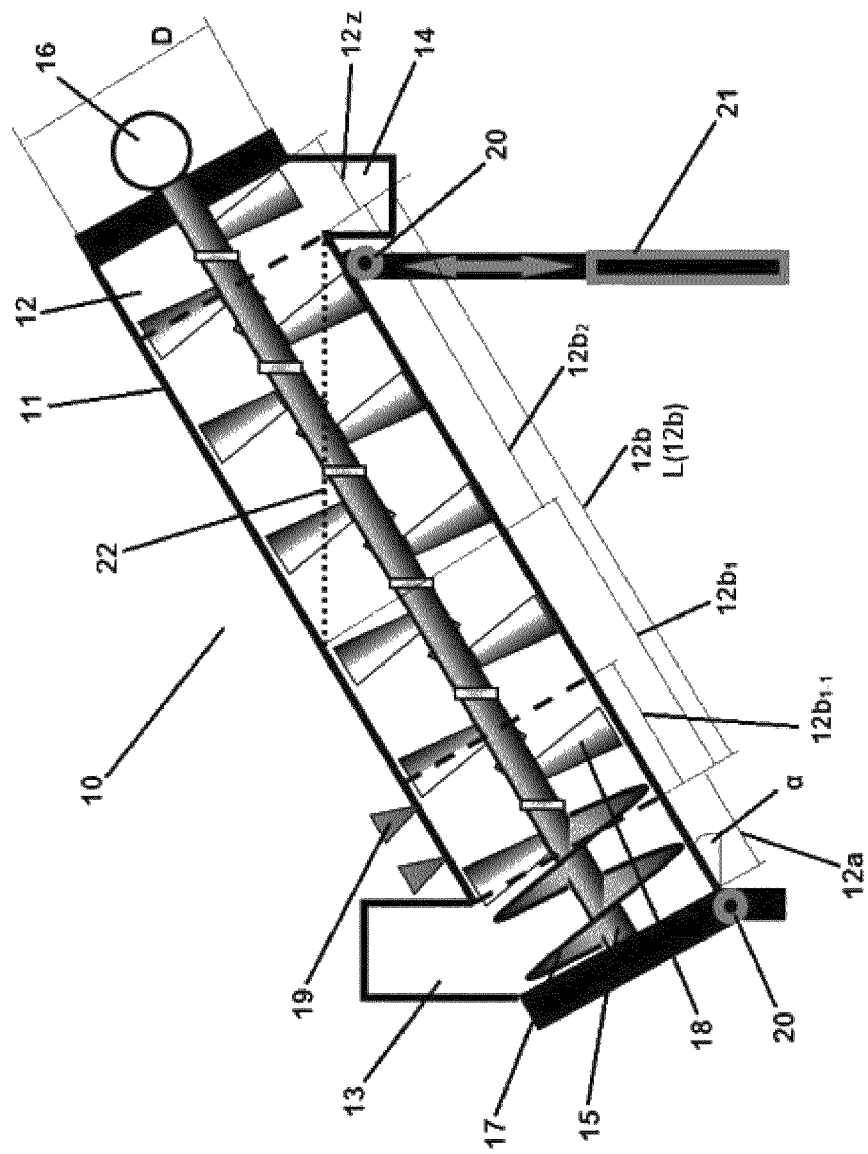
FIG. 1: a schematic longitudinal section of an illustrative embodiment of an inventive apparatus.

In FIG. 1 an apparatus of the invention is schematically illustrated. The apparatus 10 comprises, as a key constituent, a tubular mixing drum 11 having an elongated tubular cavity 12 of essentially circular cross-section for receiving a granular adsorbent material. On the upstream end of the cavity 12, an adsorbent inlet opening 13 is provided on the upper side of the cavity wall. On the downstream end of the cavity 12, a product outlet opening 14 is provided on the lower side of the cavity wall.

Figure 2:
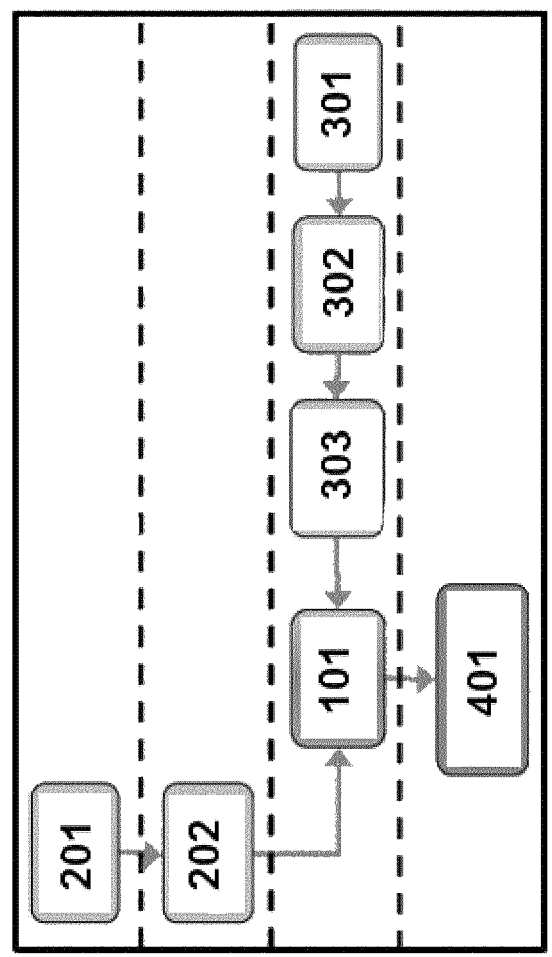
FIG. 2: a flow diagram illustrating the process of the invention.

The inlet opening 13 may be connected to a feeding apparatus for continuously introducing a controlled amount of granular adsorbent material to the cavity 12, such as a suitable gravimetric loss-on-weight type powder feeder. Such is apparent from the flow diagram of FIG. 2, where the mixing step 101 that is carried out in the apparatus 10 is preceded, on the one hand, by a step 201 of charging a feeder from a granular adsorbent material reservoir and a step 202 of feeding the granular adsorbent material to the inlet 13.

A rotating shaft 15 extends through the cavity in longitudinal direction. The shaft 15 is arranged in the center of the circle defined by the cross-section of the cavity 12 and is operably connected to an electric motor 16 for driving the shaft 15 at a desired rotation speed.

The rotating shaft 15 comprises two types of rotating annexes that are distributed over the length of the cavity 12, namely a helical conveying blade 17 and mixing paddles 18. The helical conveying blade 17 is arranged around the shaft 15 in the initial section of the cavity 12 that is adjacent to the inlet opening 13. The mixing paddles 18 are distributed over the remaining length of the shaft 15 in the subsequent part of the cavity 12. Owing to these two different types of annexes, the cavity can be divided in two main longitudinal sections, namely an initial transport zone 12a that is adjacent to the inlet 13 and a subsequent mixing zone 12b that extends from the initial transport zone 121 to the outlet 14. A discharge zone 12z follows the mixing zone 12b at the downstream end.

The apparatus 10 further comprises injection nozzles 19 for injecting a liquid adsorbate to the cavity 12, and more specifically to an early position within the mixing zone 12b of the cavity 12. The injection nozzles 19 are connected to a suitable liquid supply that includes a tank, a heating, a liquid pump and a volume flow meter whose signal is used to regulate pump operation. Such, again, is apparent from the flow diagram of FIG. 2, where the mixing step 101 is also preceded by a step 301 of suctioning liquid adsorbate from a liquid adsorbate tank and, optionally, preheating the liquid adsorbate to a desired temperature, a step 302 of pumping the liquid adsorbate to the nozzles 19 and a step 303 of measuring the volume flow towards the nozzles 19.

The outlet opening 14 can be connected to a suitable packaging apparatus for weighting and packaging the product. Also this is apparent from the flow diagram of FIG. 2, where the mixing step 101 is followed by a packaging step 401.

Still further, the apparatus comprises a lifting means including suitable swivel joints 20 and a hydraulic cylinder 21 for lifting the end section of the tubular mixing drum 11 to adjust a certain incline of the tubular cavity 12. In consideration of the incline, the mixing zone 12b of the cavity 12 can further be subdivided in a fully filled section $12b_1$ and a partially filled section $12b_2$. Specifically, owing to the essentially fluid behavior of suitable granular adsorbent materials, the materials will form an essentially planar surface 22 within the cavity 12, which is symbolized in FIG. 1 with a dotted line. The surface level corresponds essentially to the level of the exit opening 14, as any fluidly behaving material that reaches the level of the exit opening 14 will flow out of this opening 14. The longitudinal position of the boundary between the fully filled section $12b_1$ and the partially filled section $12b_2$ hence depends on the ratio of length $L(12b)$ to diameter D of the mixing zone 12b as well as on the incline angle α. In the schematic illustration of FIG. 1, these parameters are such that the length of the fully filled section $12b_1$ corresponds approximately to the length of the partially filled section $12b_2$.

In this regard, it is preferred that the injection nozzles 19 are arranged at an early position within the mixing zone 12b, that is fully filled in operation. The section of the mixing zone where the liquid adsorbate is injected hence constitutes a subsection of the fully filled section $12b_1$, and is symbolized in FIG. 1 by reference numeral $12b_{1-1}$.

Figure 3:
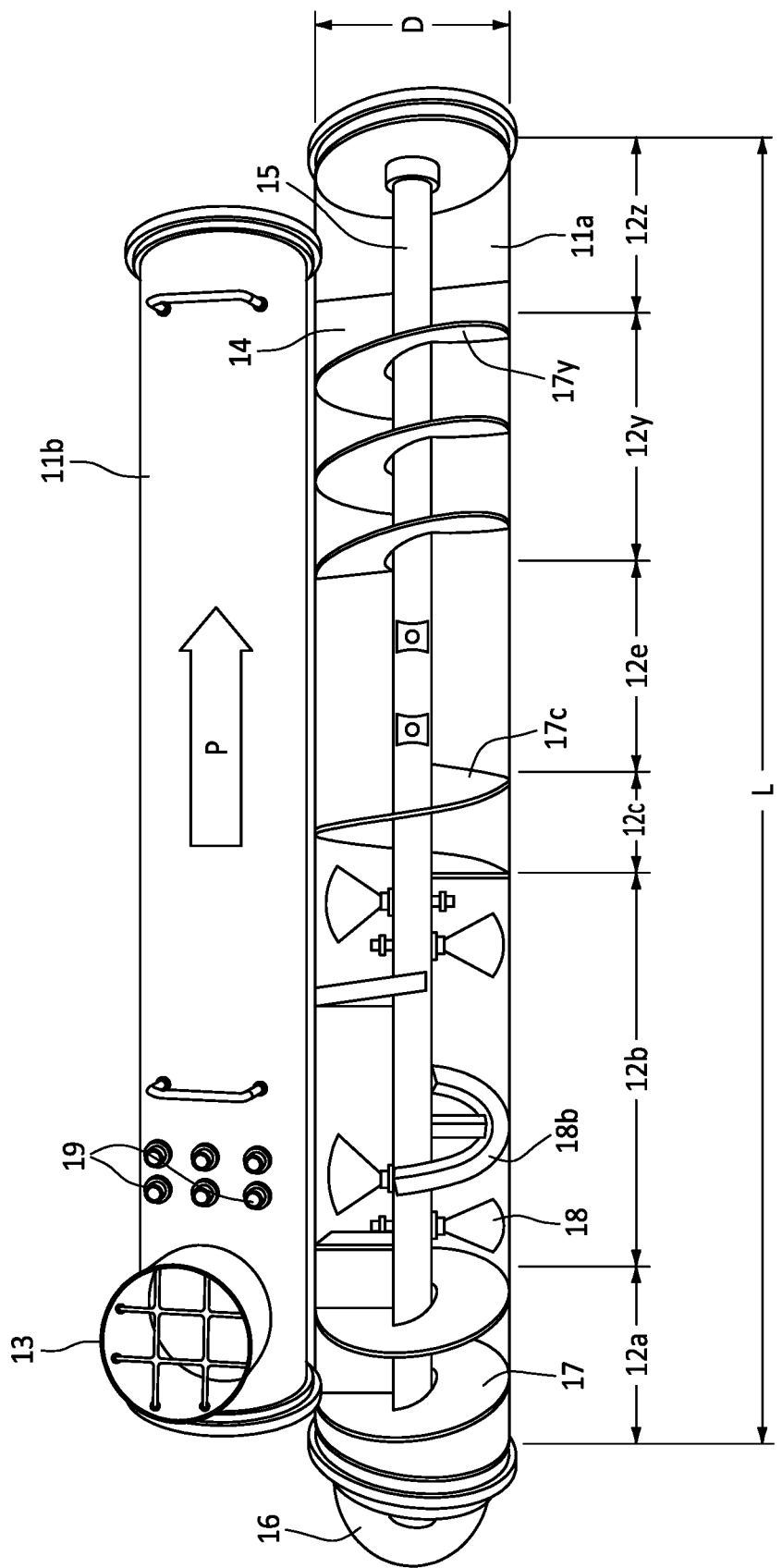
FIG. 3: a longitudinal section of the mixing drum of a concrete embodiment of an inventive apparatus.

In FIG. 3 a mixing drum of a concrete embodiment of an inventive apparatus is illustrated. Identical reference numerals as in FIG. 1 are used for corresponding parts.

The mixing drum 11, rotating shaft 15 and rotating annexes are all made of stainless steel. The mixing drum 11 consists of two halves, a base 11a and a lid 11b. The inlet opening 13 and the injection nozzles 19 are arranged at the lid 11b. The rotating shaft 15, motor 16 and the outlet opening 14 are arranged at the base 11a. The overall length L of the cavity 12 is 140 cm and the diameter D is 20 cm, accounting for an L/D ratio of 7.0 and a total chamber volume of 0.044 m³.

The regular rotation direction of the shaft 15 is counterclockwise, when looking in the direction of the product flow that is symbolized in FIG. 3 by arrow P.

As opposed to the apparatus schematically illustrated in FIG. 1, the apparatus of FIG. 3 is more complex as far as the rotating annexes of the shaft 15 and, correspondingly, the zones of the cavity are concerned. Specifically, between the initial transport zone 12a and the discharge zone 12z of the cavity, there are, in consecutive arrangement, a mixing zone 12b, an intermediate transport zone 12c, a resting zone 12e and a terminal transport zone 12y.

In the mixing zone 12b the shaft 15 carries a number of mixing instruments. These mixing instruments comprise two pairs of mixing paddles 18, wherein the individual paddles 18 of the pairs are slightly offset in longitudinal direction. Between the pairs there are arranged two helical mixing blade fragments 18b that, in contrast to the helical conveying blade 17 of the initial transport zone 12a, does not comprise a closed surface but is rather an open construction such as to limit the feeding forward action. The nozzles 19 are arranged at a longitudinal position corresponding to the upstream pair of mixing paddles 18.

In the intermediate transport zone 12c, a helical conveying blade 17c whose blade shape and angle corresponds to the helical conveying blade 17 of the initial transport zone 12a is arranged around the shaft 15. The intermediate transport zone 12c is rather short and the number of full rotations of the helical conveying blade 17c around the shaft 15 is less than two.

In the resting zone 12e, the shaft 15 comprises no mixing or conveying annexes.

Finally, in the terminal transport zone 12y, another helical conveying blade 17y is arranged around the shaft 15, whose blade shape and angle again corresponds to the helical conveying blade 17 of the initial transport zone 12a.

In an experimental setup, the apparatus as in FIG. 3 was loaded with a particulate silica material with a nominal median particle size of between 200-400 μm and a liquid of essentially pure E vitamins (TATG; tocopheryl acetate technical grade) having a viscosity of approx. 1000 mPa·s at 37° C. as liquid adsorbent material. The weight ratio of the granular silica material and the liquid adsorbent material was 48/52. The inclination of the cavity 12, i.e., the angle α was set to 33°. The rotation speed of the shaft was set to 45 rpm, which led to a peripheral speed of the conveying and mixing instruments of around 0.5 m/s. Nozzle pressure was 4.5 bar and liquid temperature was 37° C. Silica temperature was 27° C.

Using these settings, the filled chamber volume was determined at 0.015 m³, corresponding to approx. 34% of the total chamber volume. The feed rates (granular material) necessary to attain certain average residence times (standard deviation is about 40%) as determined in this experiment are outlined in Table 1 below.

TABLE 1

| Residence time | Feed rate |
| --- | --- |
| 10 min | 52 kg/h |
| 15 min | 35 kg/h |
| 20 min | 26 kg/h |

Where the mean residence time was set to 15 minutes, a dry product of good homogeneity was obtained. It can thus be expected that a 10-15 minutes residence time would be sufficient in the given setting. Accordingly, scaling calculations would suggest that an output of several tons of product per hour would be attainable with bigger mixers having a chamber volume of, for example, between 0, 1 and 2 m³. Such scaling calculations for commercially available mixers are shown in Table 2 below.

TABLE 2

| | Pilot Mixer | Ruberg DLM 350-1500 | | | Ruberg DLM 800-3000 | | |
| --- | --- | --- | --- | --- | --- | --- | --- |
| L [m] | 1.4 | 1.5 | | | 3.0 | | |
| D [m] | 0.2 | 0.35 | | | 0.8 | | |
| L/D | 7.0 | 4.3 | | | 3.8 | | |
| chamber [m³] volume | 0.0044 | 0.144 | | | 1.507 | | |
| filled [%] | 34 | 34 | 50 | 75 | 34% | 50% | 75% |
| chamber [m³] volume | 0.015 | 0.049 | 0.072 | 0.108 | 0.512 | 0.754 | 1.130 |
| feed rate at residence time [kg/h] | | | | | | | |
| 5 min | 104 | 342 | 502 | 752 | 3.566 | 5.246 | 7.868 |
| 10 min | 52 | 171 | 251 | 376 | 1.783 | 2.623 | 3.934 |
| 15 min | 35 | 114 | 167 | 251 | 1.189 | 1.748 | 2.623 |
| 20 min | 26 | 85 | 125 | 188 | 892 | 1.311 | 1.967 |

Figure 4:
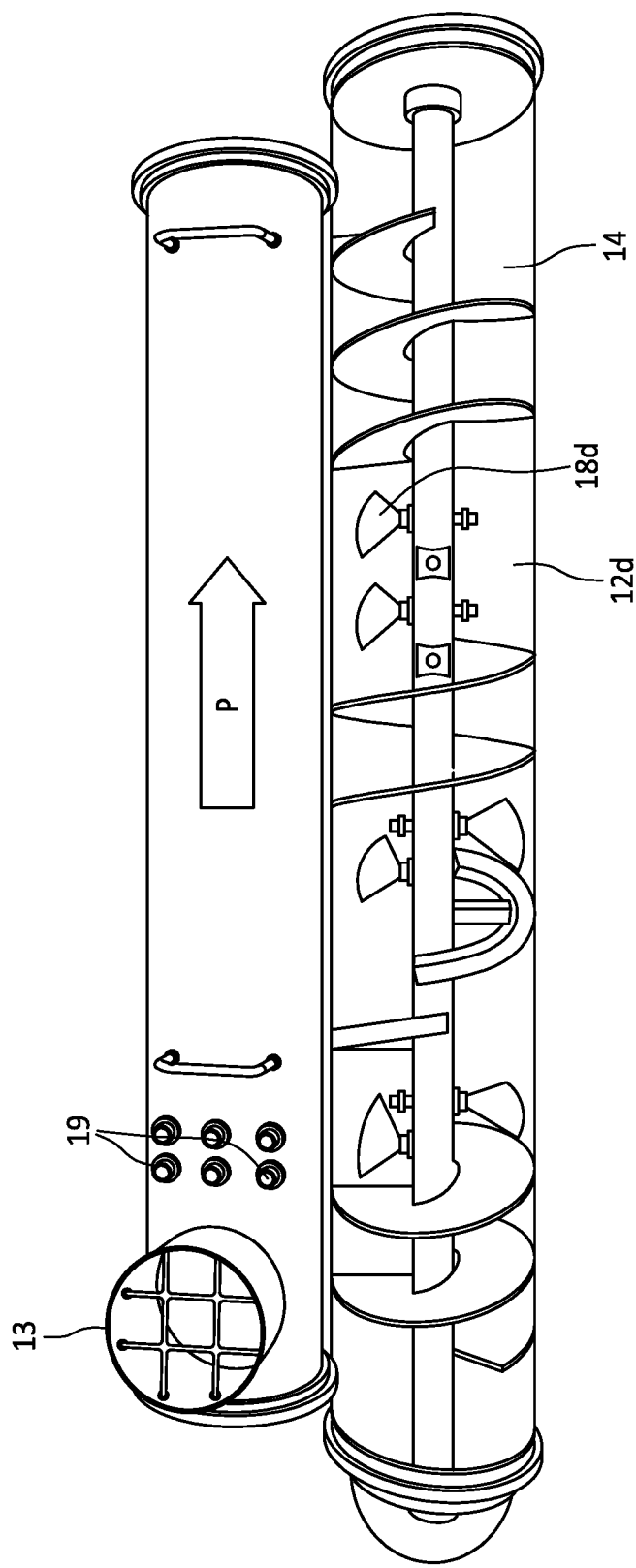
FIG. 4: a longitudinal section of the mixing drum of another concrete embodiment of an inventive apparatus.

In FIG. 4 another mixing drum of a concrete embodiment of an inventive apparatus is illustrated. Again, identical reference numerals as in FIG. 1 are used for corresponding parts.

The mixing drum 11 of FIG. 4 differs over the mixing drum of FIG. 3 in that the resting zone 12e is replaced by a secondary mixing zone 12d that comprises a number of mixing paddles 18d that are offset in longitudinal direction. The configuration and shape of these paddles 18d is identical to the configuration and shape of the paddles 18 of the primary mixing zone 12b.

In an experimental setup, the apparatus as in FIG. 4 was loaded with a particulate silica material with a nominal median particle size of between 45-50 μm and a solution of 23% of 3-Nitrooxypropanol (3NOP, a drug given to ruminants to reduce methane emission) dissolved in 77% propylene glycol solvent as liquid adsorbent material. The weight ratio of the granular silica material and the liquid adsorbent material was 50/50. The inclination of the cavity 12, i.e., the angle α was set to 33°. The rotation speed of the shaft was set to 45 rpm, which led to a peripheral speed of the conveying and mixing instruments of around 0.5 m/s. Nozzle pressure was 6 bar and liquid temperature was 15° C. Silica temperature was 27° C.

Using these settings, the filled chamber volume was determined at 0.017 m³, corresponding to approx. 38% of the total chamber volume. The feed rates (granular material) necessary to attain certain average residence times (standard deviation is about 40%) as determined in this experiment are outlined in Table 3 below.

TABLE 3

| Residence time | Feed rate |
| --- | --- |
| 2 min 30 sec | 249 kg/h |
| 5 min | 124 kg/h |
| 7 min | 89 kg/h |
| 10 min | 62 kg/h |

Figure 5:
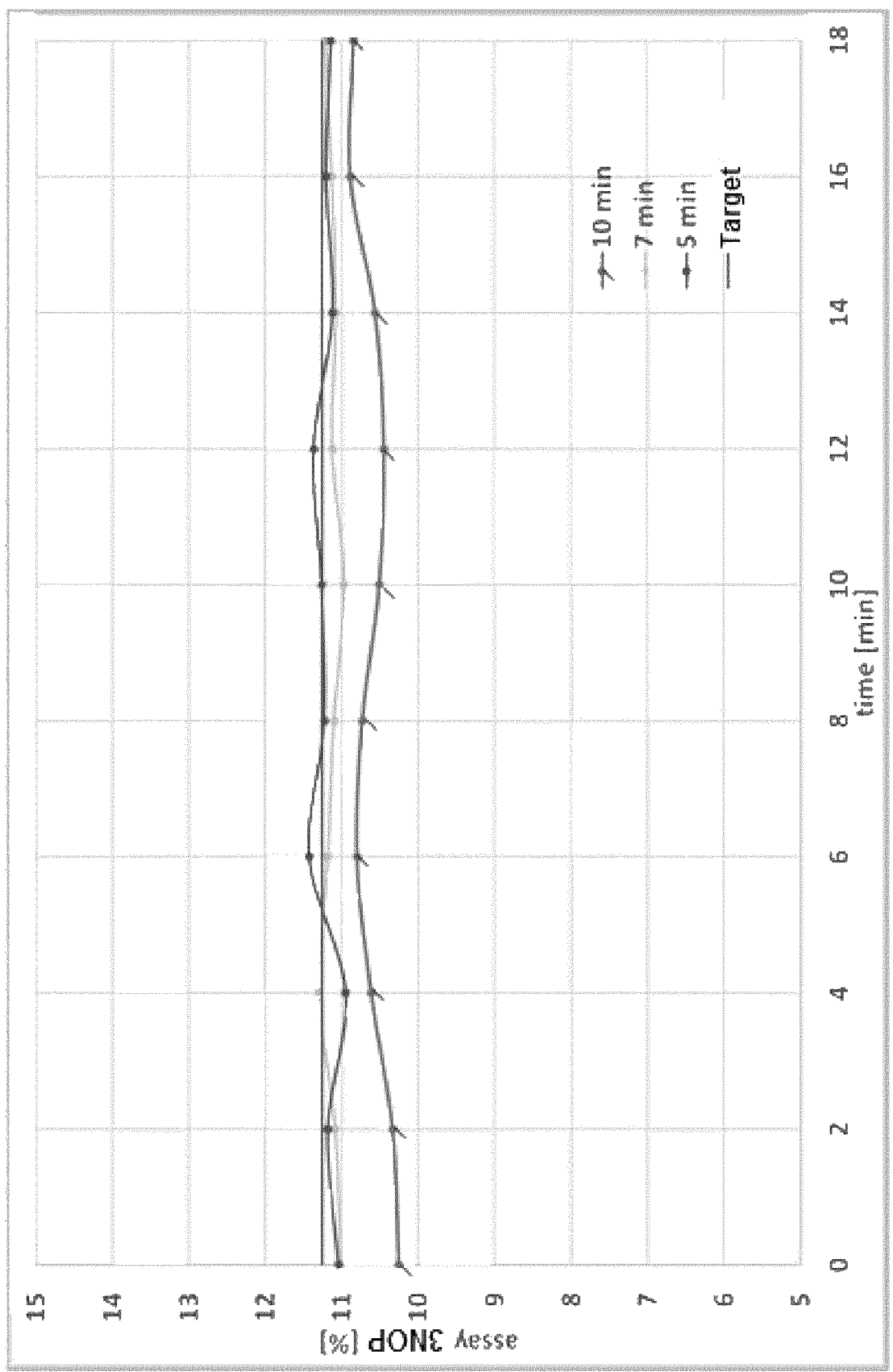
FIG. 5: an assay showing the surface loading of an adsorbate over process time at different residence times.

In FIG. 5 an assay is shown that illustrates the surface loading of 3NOP over process time at different residence times. While it would be expected that lowering the residence times have a negative impact on the adsorption homogeneity, the assay shows indeed very good adsorption homogeneity even at an average residence time of only 2 min 30 sec. Accordingly, scaling calculations would suggest that an output of several tons of product per hour would be attainable with bigger mixers having a chamber volume of, for example, between 0, 1 and 2 m³. Such scaling calculations for commercially available mixers are shown in Table 4 below.

TABLE 4

|  | Pilot Mixer | Ruberg DLM 350-1500 | | | Ruberg DLM 800-3000 | | |
|---|---|---|---|---|---|---|---|
| L [m] | 1.4 | 1.5 | | | 3.0 | | |
| D [m] | 0.2 | 0.35 | | | 0.8 | | |
| L/D | 7.0 | 4.3 | | | 3.8 | | |
| chamber [m³] volume | 0.0044 | 0.144 | | | 1.507 | | |
| filled [%] | 38 | 38 | 50 | 75 | 38% | 50% | 75% |
| chamber [m³] volume | 0.017 | 0.055 | 0.072 | 0.108 | 0.573 | 0.754 | 1.130 |
| feed rate at residence time [kg/h] | | | | | | | |
| 2.5 min | 249 | 816 | 1.073 | 1.610 | 8.522 | 11.214 | 16.820 |
| 5 min | 124 | 408 | 537 | 805 | 4.261 | 5.607 | 8.410 |
| 7 min | 89 | 291 | 383 | 575 | 3.044 | 4.005 | 6.007 |
| 10 min | 62 | 204 | 268 | 402 | 2.131 | 2.803 | 4.205 |

Similar assays have demonstrated no difference in loading and homogeneity between adsorbate temperatures of 15° C., 25° C. and 35° C.

It is understood that the apparatuses of FIGS. 4 and 5, i.e., with mixing zone or secondary mixing zone, could interchangeably be used for both experiments described above.

The invention claimed is:

1. A process for the continuous production of a particulate adsorption product using an apparatus comprising:
 a mixing drum having an elongated cavity for receiving a particulate adsorbent material, an adsorbent inlet and a product outlet, wherein
 the mixing drum is arranged such that the cavity is inclined in flow direction of the particulate material, and the cavity comprises an initial transport zone adjacent to the inlet and a mixing zone following the initial transport zone;
 a rotating member extending through the cavity in a longitudinal direction, wherein the rotating member comprises a helical conveying blade at longitudinal positions corresponding to the initial transport zone and mixing instruments at longitudinal positions corresponding to the mixing zone; and
 one or more injection nozzles for injecting a liquid adsorbate to the mixing zone, the process comprising the steps of:
 continuously feeding a flowable particulate adsorbent material into the initial transport zone of the cavity through the inlet, wherein the particulate adsorbent material is a silica, charcoal, or zeolite material;
 continuously injecting a liquid adsorbate into the mixing zone of the cavity through the nozzles, wherein the liquid adsorbate is a pure liquid active or a liquid solution or dispersion of an active, with the active being a biologically active component; and
 continuously operating the rotating member to propagate the adsorbent through the initial transport zone to the mixing zone and to agitate the adsorbent and the adsorbate in the mixing zone.

2. The process of claim 1, wherein the rotating member is operated at a rotational speed such that the peripheral speed of the helical conveying blade and the mixing instruments is 1 m/s or less.

3. The process of claim 1, wherein the particulate adsorbent materials is a porous material having a specific surface area of at least 100 m²/g.

4. The process of claim 1, wherein the feed rate of particulate adsorbent material and the rotational speed of the rotating member are adjusted such that the average residence time of the particulate material is between 2 and 20 minutes.

5. The process of claim 4, wherein the feed rate of particulate adsorbent material and the rotational speed of the rotating member are adjusted such that the average residence time of the particulate material is between 5 and 10 minutes.

6. The process of claim 1, wherein the cavity volume unoccupied by the particulate material is filled with ambient air.

7. The process of claim 1, wherein the mixing instruments comprise mixing paddles.

8. The process of claim 7, wherein the operative surfaces of the paddles are slanted backwards.

9. The process of claim 1, wherein the cavity further comprises a terminal transport zone adjacent to the outlet and, at longitudinal positions corresponding to the terminal transport zone, the rotating member comprises a further helical conveyor blade.

10. The process of claim 1, wherein the cavity further comprises a resting zone following the mixing zone and at longitudinal positions corresponding to the resting zone, the rotating member is devoid of mixing instruments or conveyor blades.

11. The process of claim 10, wherein the cavity further comprises an intermediate transport zone between the mixing zone and the resting zone, or within the mixing zone, and, at longitudinal positions corresponding to the intermediate transport zone, the rotating member comprises another helical conveyor blade.

12. The process of claim 11, wherein the resting zone extends over at least 10% of the length of the cavity and/or has a longitudinal extension that is equal or greater than the longitudinal extension of the initial transport zone, the terminal transport zone, the intermediate transport zone, or one of the mixing zones.

13. The process of claim 1, wherein the incline angle is between 15 and 45° and/or wherein the L/D ratio of the cavity is between 2 and 10.

14. The process of claim 1, wherein the incline angle and the length and diameter of the mixing zone are such that there are longitudinal positions within the mixing zone whose entire cross-section remains below the level of product removal.

15. The process of claim 14, wherein the incline angle, the length of the mixing zone and the positions of the injection nozzles are such that all injection nozzles are located below the level of product removal.

16. The process of claim 1, wherein the apparatus comprises a lifting device for adjusting the incline of the cavity.

17. The process of claim 16, wherein the lifting device comprises one or more hydraulic cylinders.

18. The process of claim 12, wherein the resting zone extends over at least 15% of the length of the cavity.

19. The process of claim 18, wherein the resting zone extends over at least 20% of the length of the cavity.

20. The process of claim 13, wherein the L/D ratio of the cavity is between 3 and 7.

21. The process of claim 7, wherein the mixing paddles are distributed over the length of the mixing zone.

22. The process of claim 14, wherein longitudinal positions whose entire cross-section remains below the level of product removal, account for at least 30% of all longitudinal positions within the mixing zone.

\* \* \* \* \*